United States Patent [19]

Rückert

[11] Patent Number: 5,593,244

[45] Date of Patent: Jan. 14, 1997

[54] BACKREST LOCK

[75] Inventor: Edvard Rückert, Velbert, Germany

[73] Assignee: Ewald Witte GmbH & Co. KG, Velbert, Germany

[21] Appl. No.: 287,168

[22] Filed: Aug. 8, 1994

[30] Foreign Application Priority Data

Sep. 2, 1993 [DE] Germany ............... 43 29 634.3

[51] Int. Cl.⁶ .................................................. B60N 2/20
[52] U.S. Cl. ................... 403/322; 403/323; 403/324; 403/325
[58] Field of Search ................... 403/322, 323, 403/324, 325, 321

[56] References Cited

U.S. PATENT DOCUMENTS

| 1,955,969 | 4/1934 | Marzolf | 403/322 X |
|---|---|---|---|
| 2,061,448 | 11/1936 | Bath et al. | 403/322 X |
| 2,142,454 | 1/1939 | Needham | 403/322 X |
| 2,210,797 | 8/1940 | Crim | 403/322 X |
| 2,497,319 | 2/1950 | Mott | 403/322 X |
| 3,450,425 | 6/1969 | Leonhardt | 403/322 X |
| 4,132,489 | 1/1979 | Berg, Jr. et al. | 403/322 X |
| 4,179,225 | 12/1979 | Asplund | 403/322 |
| 4,392,538 | 7/1983 | Goertzen | 403/322 X |
| 4,425,843 | 1/1984 | Jacobsen et al. | 403/322 X |
| 4,983,065 | 1/1991 | Späth | 403/322 X |
| 5,141,354 | 8/1992 | Morsbach | 403/322 |

FOREIGN PATENT DOCUMENTS 8906765 10/1990 Germany.

Primary Examiner—Terry Lee Melius
Assistant Examiner—Christopher J. Novosad
Attorney, Agent, or Firm—Martin A. Farber

[57] ABSTRACT

The present invention relates to a locking device consisting of latch member and mating closure part for a swingable backrest of an automobile or the like, which latch member and mating closure part have fastening for in each case point attachment, on the one hand, to the backrest and, on the other hand, in fixed position to the body of the automobile, and the latch member has a manually actuatable detent element which enters into engagement behind the step on the mating closure part in order to obtain a locking position, an insertion pocket (2) which is formed by the latch member (1) for receiving the mating closure part (4) which is developed as a strap (3) and a latch head (6, 7; 48) which is formed by the detent member and is displaceable substantially transverse to the lengthwise direction in the pocket for engagement with a notching (8, 9, 10, 11; 51, 52, 53) associated with a strap (3) are provided.

21 Claims, 7 Drawing Sheets

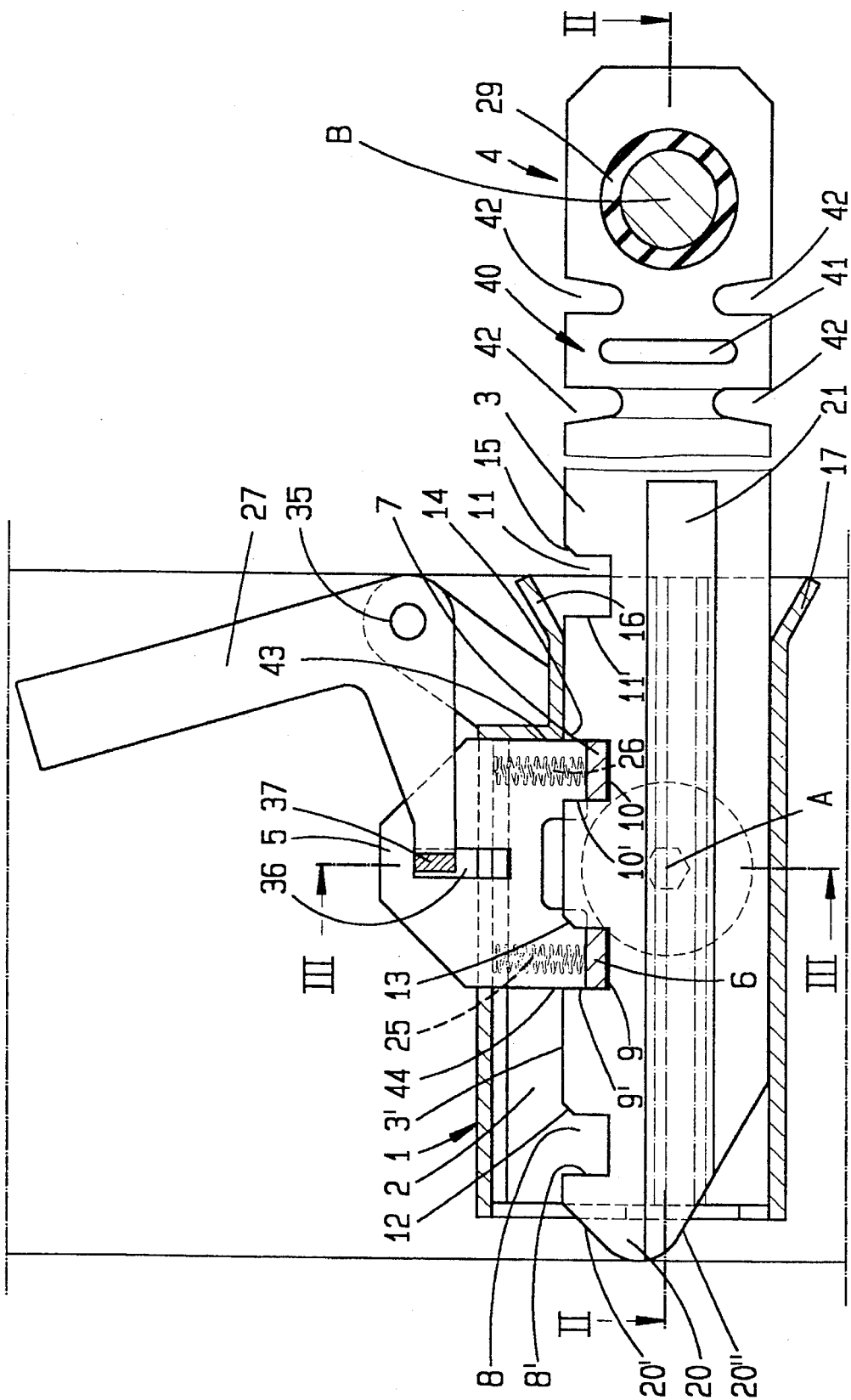

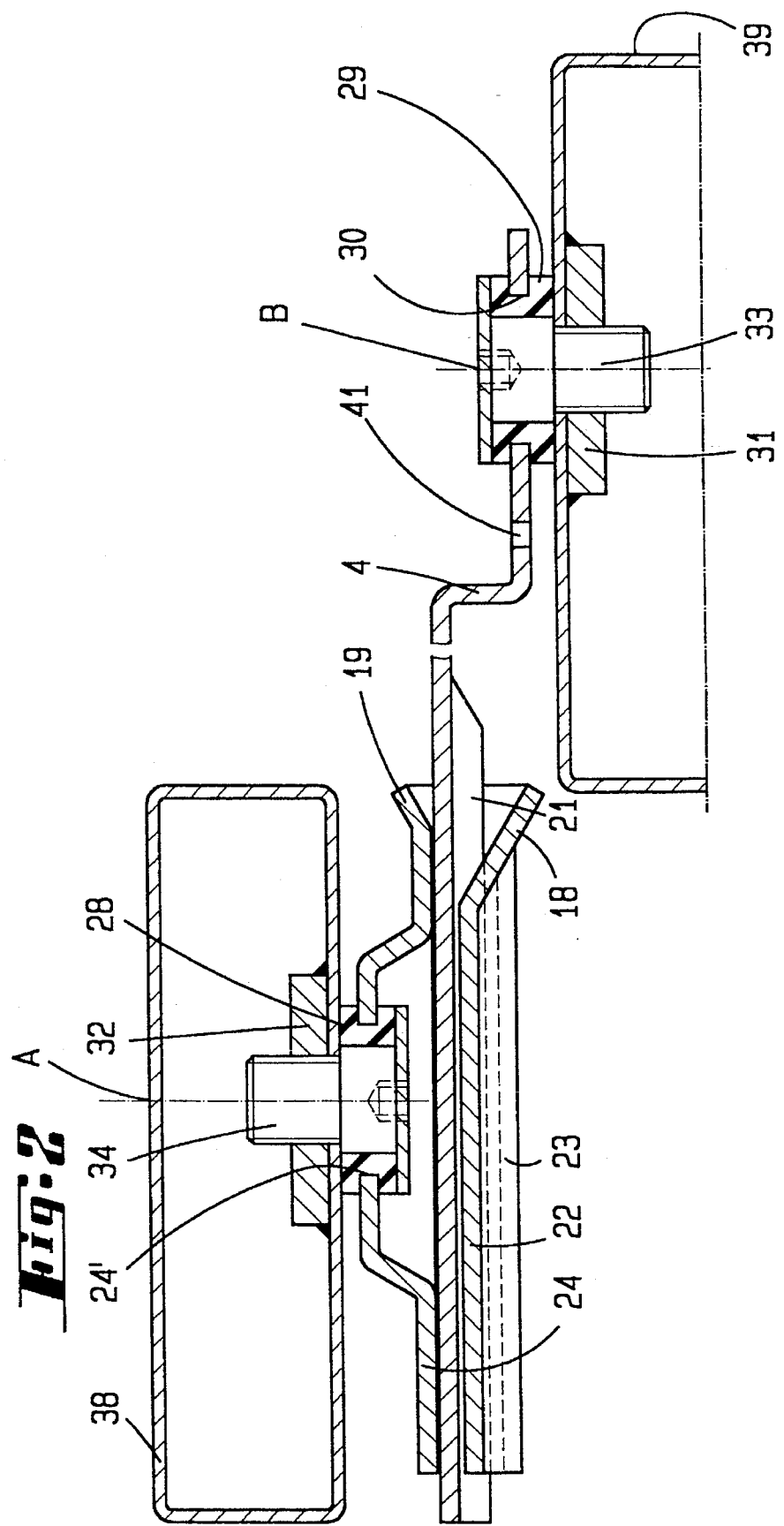

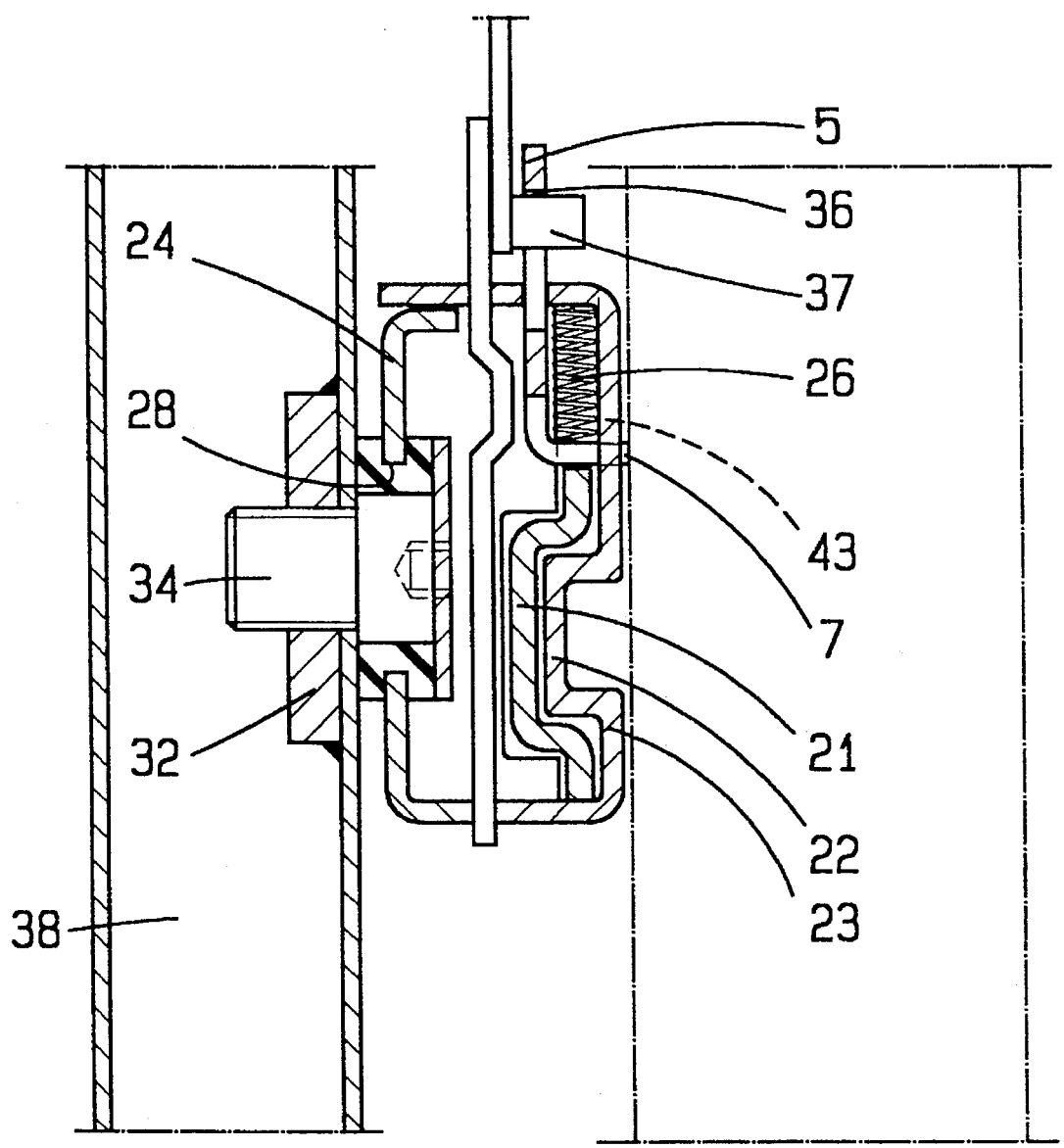

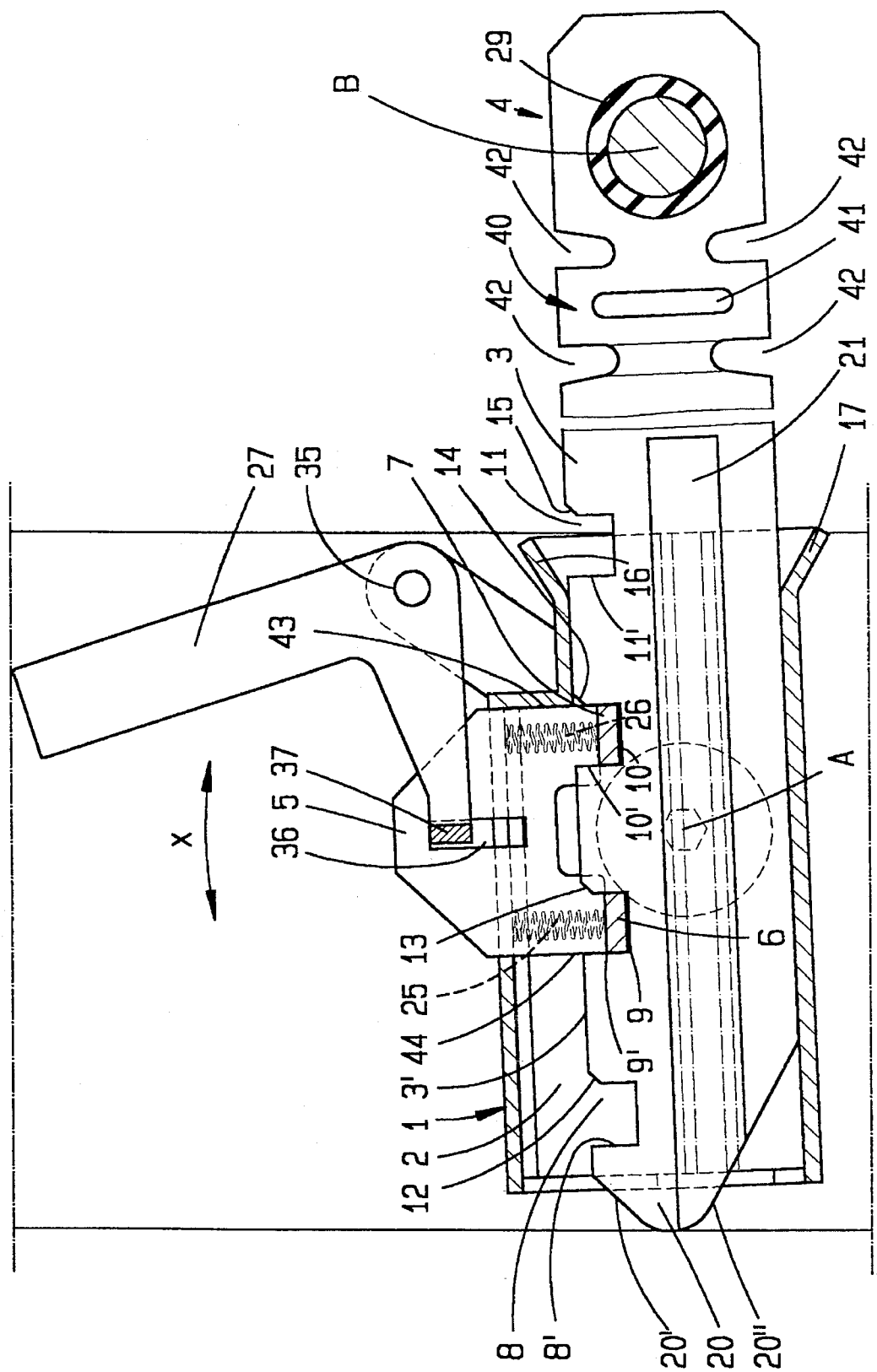

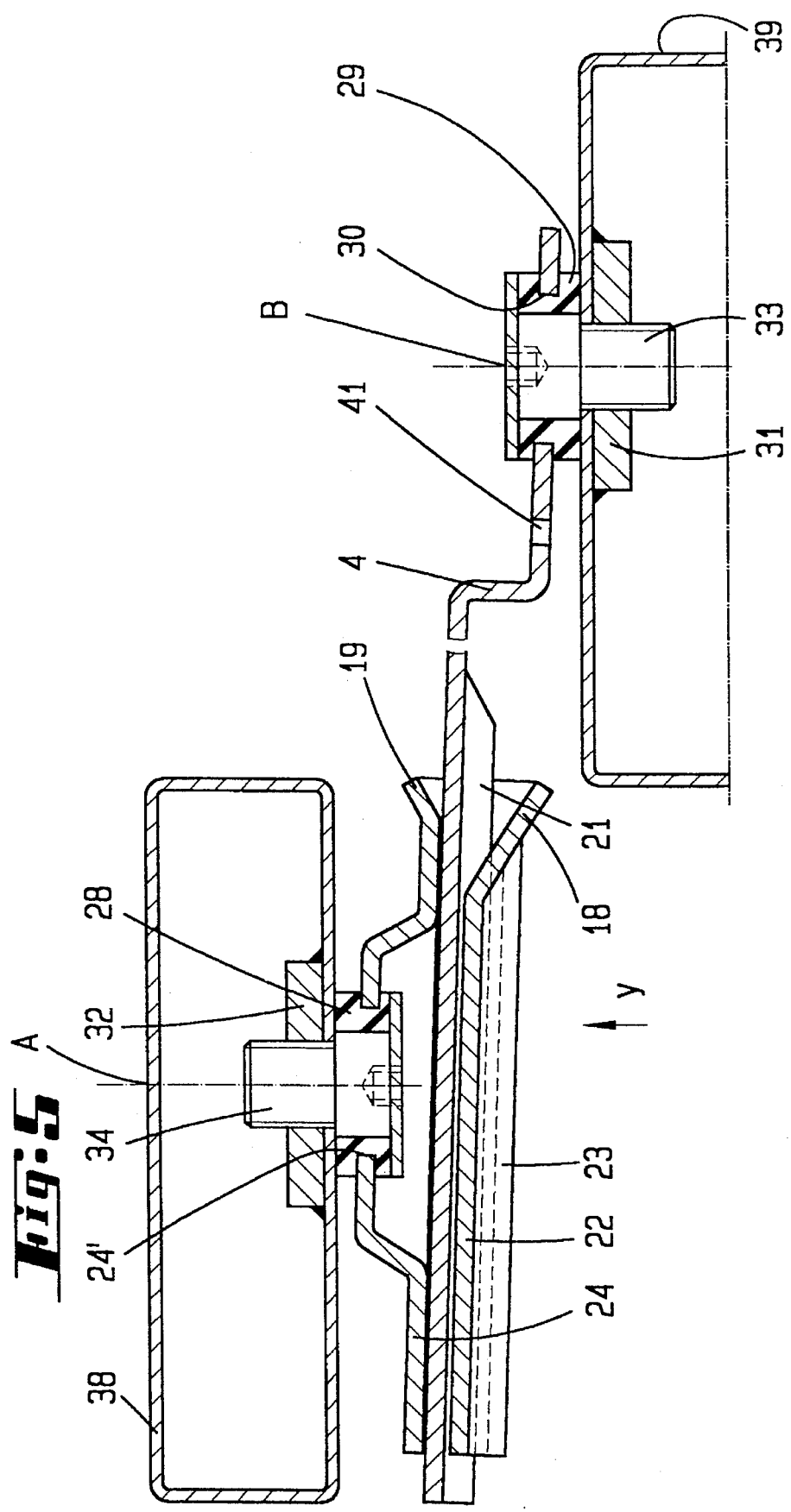

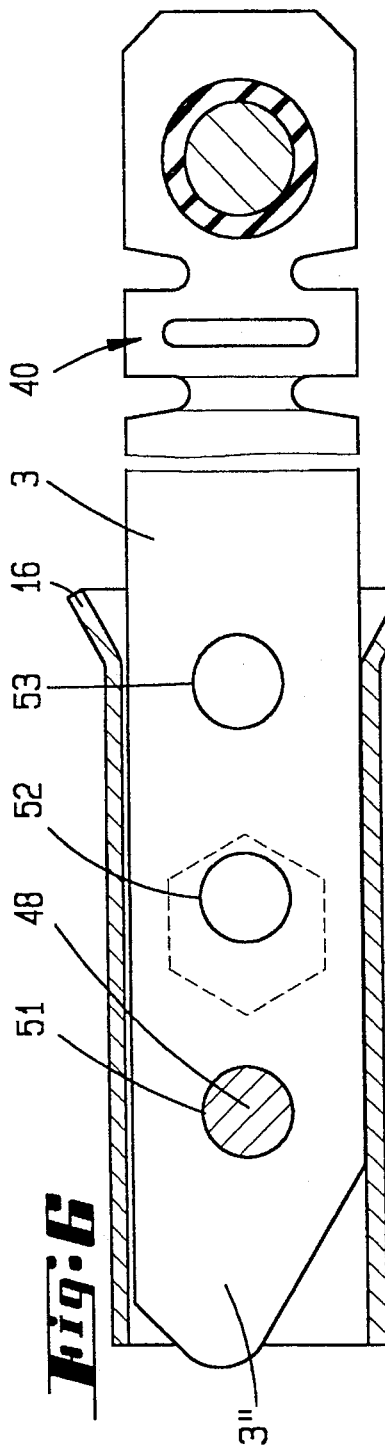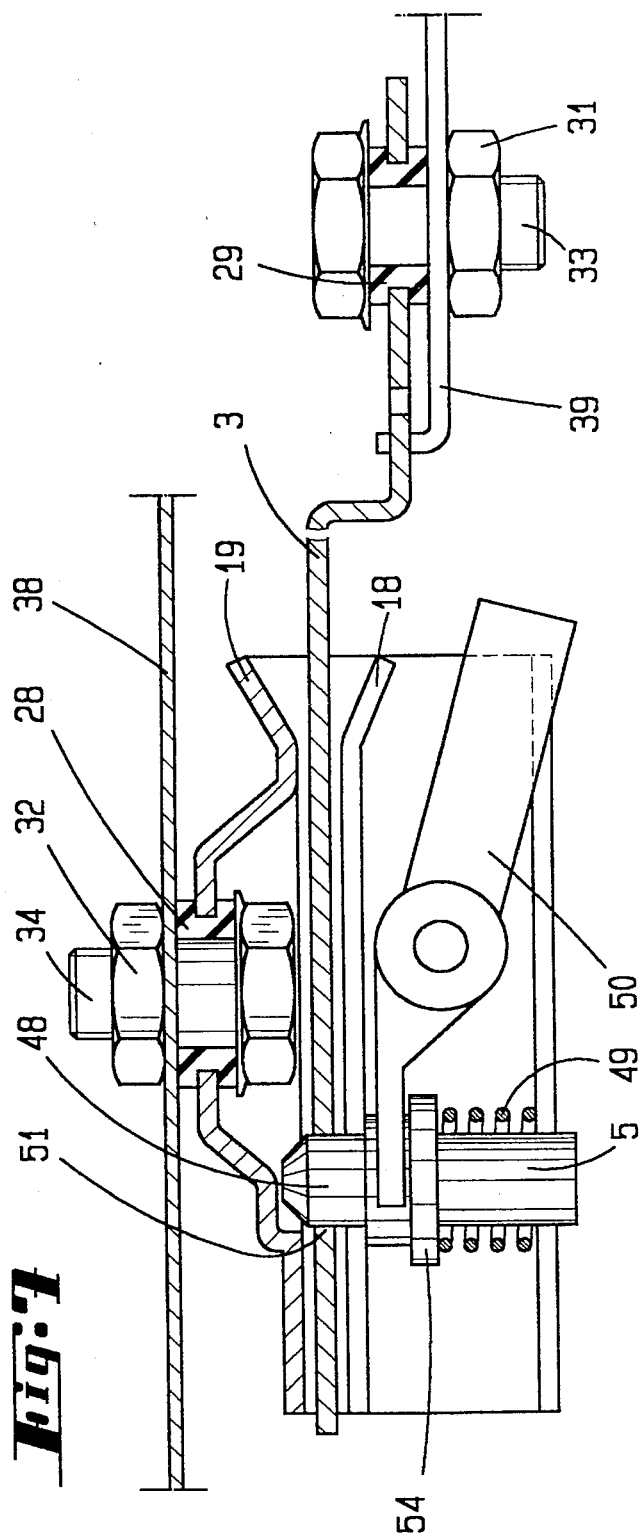

BACKREST LOCK

FIELD AND BACKGROUND OF THE INVENTION

The present invention relates to a locking device consisting of a latch member and a mating closure part for a swingable backrest of an automobile or the like.

In the known locking devices, either the latch member or the mating closure part is fastened, for instance, to the backrest and the other part is fastened in fixed position to the body, for instance to the so-called C-frame. It is known to develop the latch member in hook shape, actuatable by hand. The corresponding mating member, in the case of one known locking device, is fastened to the so-called C-frame and is developed as a bolt extending parallel to the hinge axis, the bolt forming a step in such a manner that the hook of the latch member can engage behind it. In order effectively to restrain objects present behind the backrest upon sharp deceleration, high requirements are made as to the stability of the locking devices. Backrests which form part of seats are generally made with relatively large tolerances so that the relative position of the point of attachment, which is fixed on the body of the car, and the attachment point associated with the backrest differ greatly.

SUMMARY OF THE INVENTION

The object of the invention is therefore to develop a locking device of this type which is advantageous in use.

As a result of the invention, a locking device consisting of latch member and mating closure part is provided which is easy to mount and suitably tolerates manufacturing tolerance. The latch member forms an insertion pocket to receive the mating closure part, which can assume the form of a lock box which can be turnably mounted. The strap which is formed by the mating closure part can be of blade shape. It is intended for insertion into the insertion pocket of the latch member. The strap has notches into which a latch head which is displaceable substantially transverse to the lengthwise direction of the strap can engage. The notching can be arranged at different places on the strap. The transversely displaceable latch head is then provided, in a manner corresponding thereto, in the lock box. Several notches, arranged one behind the other, can be present. The strap can then be held fast in different positions of insertion by engagement of the latch head in one of the notches in the strap. In this way, different positions of the seat with different inclinations of the backrest are possible. In accordance with a preferred embodiment, several, in particular two, latch heads are developed by the hook element. The notches which lie behind each other and may, for instance, be four in number, can then be spaced at an equal distance from each other, this distance corresponding to the distance between the two latch heads. The hook element is preferably developed as a slide which is transversely displaceable in the pocket. Furthermore, the end opening of the insertion pocket can be developed as a catch funnel. If the free end of the strap is furthermore pointed, then, by cooperation between the inclines of the catch funnel and the free end of the strap, a self-centering insertion of the blade-shaped mating closure part into the latch member is obtained. It is then advantageous for the latch member and/or the mating closure part to be fastened turnably around an attachment point when a moment of rotation is applied. In this way, there is obtained a self-alignment, which permits large tolerances, of the latch member and the mating closure part when the two come into contact with each other. In order to increase the lengthwise stability of the mating closure part, the strap can have a cross-sectional profiling. The slide should preferably remain held in its locked position as a result of the action of an elastic element, such as, for instance, a coil spring. The latch head of the hook element or of the slide is then displaced out of the locking position against the action of this spring by the actuation of a handle which is preferably developed as an angular lever. In this connection, the latch head or heads emerge from the notch or notches of the strap so that the strap is freely movable in the insertion pocket. In order to obtain the turnability of the latch member and the mating closure part relative to the body of the car and the backrest respectively, a friction-locked (held by friction) and/or elastic connection is provided. The friction-locked connection has the advantageous property that the latch member or the mating closure part remains in position after displacement. In the case of the elastic attachment, on the other hand, there is a return moment of rotation into the original position. The opening of the insertion pocket is spaced from the attachment point. Similarly, the tip of the strap is spaced from the point of attachment of the strap. The tip can, in this connection, be formed by the one end of the strap, while the point of attachment is formed at the other end of the strap. With this development, a relatively large displacement of the tip of the strap is obtained with a relatively small angle of turning. In this way, the tolerances are advantageously compensated for. The attachment means can have a rubber body which lies between latch member and/or mating closure part and the backrest and/or the part of the body of the car. The rubber body can also be developed as a sleeve having a passage opening for a screw. The sleeve can have a circumferential groove into which the region of the edge of a receiving opening of the latch member and/or of the mating closure part extends. With this development, tilting in the direction parallel to the axis of swing is possible in addition to a friction-elastic swinging movement. In order to take up large momentums, the strap can have a stretch zone which goes into action upon overloading the strap and lengthens the strap by a certain amount. The stretch zone can be developed in the manner of a labyrinth. In a further embodiment, the latch head can be developed as a bolt. In that case, the notching of the strap is provided in its lengthwise wide side. The latch head can, however, also be developed as a bent portion of a slide. In that case, the notching can be developed as a tooth incision in the lengthwise narrow side of the strap.

BRIEF DESCRIPTION OF THE DRAWINGS

With the above and other and other advantages in view, the present invention will become more clearly understood in connection with the detailed description of preferred embodiments, when considered with the accompanying drawings of which:

FIG. 1 is a partial sectional view of a first embodiment of a locking device;

FIG. 2 is a section along the line II—II of FIG. 1;

FIG. 3 is a section along the line III-II of FIG. 1;

FIG. 4 is a showing in accordance with FIG. 1 with a different vertical spacing of the fastening axes A and B of latch member and mating member;

FIG. 5 is a showing in accordance with FIG. 2, with a different transverse spacing of latch member and mating closure part;

FIG. 6 is a second embodiment of a locking device, shown in lengthwise section;

FIG. 7 shows a device in accordance with FIG. 6 in a sectional top view; and

DETAILED DESCRIPTION OF THE PREFERRED EMBODIMENTS

Figure 8:
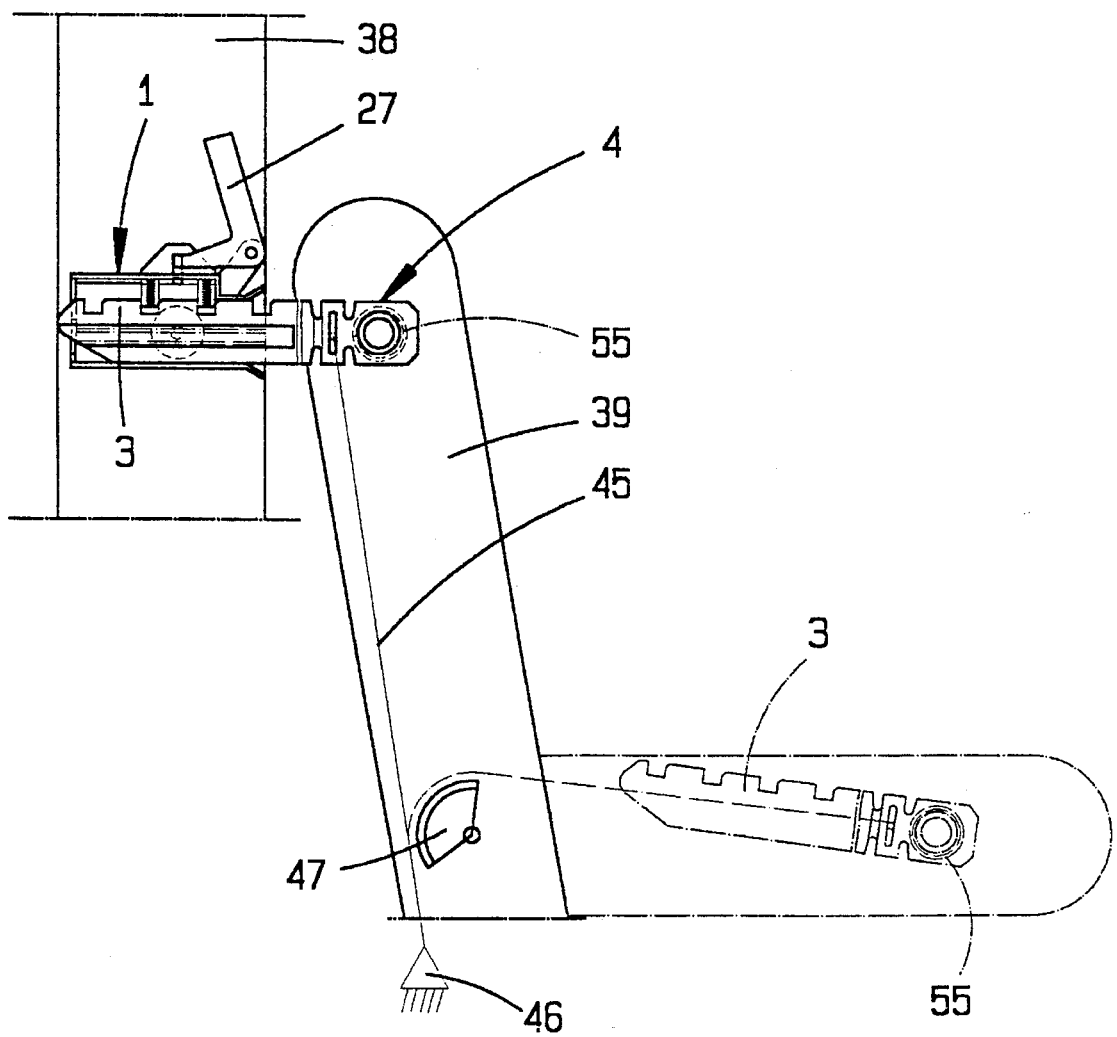
FIG. 8 is an example of the use of a locking device in accordance with FIGS. 1 to 5 on a backrest of an automobile.

In the embodiment shown in FIGS. 1–5, a strap 3 of a moving closure part 4 has substantially rectangular notches which extend from the lengthwise narrow side 3' of the strap 3 into the lengthwise wide side of the strap. There are a total of four notches 8, 9, 10, 11 which are arranged at equal distances apart on the lengthwise narrow side 3' of the strap 3. Each of the notches 8, 9, 10, 11 has facing edges which are parallel to each other The walls 8', 9', 10', 11' which lie in the direction of impact of the force extend at right angles to the direction of insertion of the strap 3. A detent element formed as a slide 5 can also be displaced transversely at right angles to the direction of insertion as a result of the actuation of a handle 27 which is swingable about a pivot pin 35. For this purpose, a nose 37 engages into a notch 36 in the slide 5 which is formed as a hook element. The hook element forms two latch heads 6, 7 which are spaced from each other, each of which can extend into one of the notches 8, 9, 10, 11 in order to obtain the locked position. The latch heads 6, 7 are formed by bent-off portions of the hook element.

With each of the two latch heads 6, 7, there is associated a spring element 25, 26 which urges the latch heads 6, 7 into their locked position. The spring elements, which are developed as compression springs 25, 26, rest at one end against the bent portions 6, 7 and at the other end against a bent-off part of the wall 23 of the insertion pocket 2. The bent-off latch heads 6, 7 are displaceable in each case within an opening 43, 44 in the wall 23. The walls opposite the walls 8', 9', 10', 11' have inclines 12, 13, 14, 15 towards the lengthwise narrow edge 3'. The inclines can serve as run-on bevels upon the insertion of the strap 3 into the insertion pocket 2 formed by the box 23, 24. The inclines, however, do not continue to the bottom of the notches 8, 9, 10, 11. Rather, between the bottom of the notches and the inclines there is a wall section which extends transverse to the direction of insertion. With latch heads displaced in the locking position, the strap is then held immovable in both directions in the pocket 2. The inclines enter into action substantially when the strap 3 is inserted into the pocket 2. As a result of the dynamics, the latch heads, 6, 7 then do not extend all the way to the bottom of the notches but only come against the inclines 12, 13, 14, 15. The latch heads then slide on these inclines and can slide on the lengthwise narrow sides 3' up to the next notch. Only upon a slowing down of the insertion movement does there take place the final engagement, with the latch heads then displaced to the bottom of the notches.

In the embodiment shown in FIGS. 6 and 7, notches 51, 52, 53 are associated with the lengthwise wide sides 3" of the strap 3. There are present there three circular notches 51, 52, 53 which are arranged approximately in the center of the wide side of the strap. A detent element 5 comprising a latch head developed as a bolt 48 then enters for locking into this strap. The bolt is developed in frustoconical shape at its end. Its diameter corresponds to the diameter of the notches 51, 52, 53. The bolt 48 has a collar 54 between which and a housing wall there is provided a spring 49 which urges the bolt 48 into its locking position. By means of a lever 50 which acts on the other side of the collar 54, the bolt 48 can be brought out of its locking position. In this unlocking position, the bolt 48 is brought out of engagement with the notch 51. The frustoconical end of the bolt 48 has substantially the same purpose as the inclines 12–15. Upon the insertion of the strap into the pocket, and with sufficiently high speed of insertion, the bolt is moved again out of the notch as a result of the inclined frustoconical surface. In its locking position, the cylindrical section of the bolt lies in one of the notches 51, 52, 53. The frustoconical head of the bolt passes for this purpose completely through the strap 3.

In this embodiment also, the bolt can engage into different notches 51, 52, 53 in order to obtain different positions of inclination of the backrest. Each of these detent positions corresponds to a different position of insertion of the strap 3 into the pocket of the latch member.

It is true, in general, of the embodiments that the distances apart of the attachment axes A, B of latch member 1 and mating closure part 4 can be changed with the strap 3 inserted to a different extent into the pocket 2. It is furthermore provided that the strap can have a substantially U-shaped cross-sectional profiling 21. The insertion pocket 2 of the latch member 1 is formed by two facing walls 23, 24. The wall 23 also forms a profiling 22, which corresponds to the profiling 21. At its end, the pocket has an opening which is developed as a catch funnel. For this purpose, bent-off wall sections 16, 17, 18, 19 which point out of the opening are provided. By this measure the cross section of the effective opening of the pocket 2 is increased. The free end 20 of the strap 3 has, in each case, an upper incline 20' and a lower incline 20". The inclines 20' and 20" can cooperate with the funnel walls 16, 17 and, upon offset in height or a non-aligned position of latch member and mating closure part, permit the introduction of the latch into the pocket 2.

Upon the introduction of the strap 3 into the pocket 2, the strap 3 can be swung around the axis B and the latch member 1 swung around the axis A. In order to permit this swinging movement, a pivot point attachment, permitting turning, of the latch member 1 to the part 38 of the body of the automobile is provided, and a similar connection of the closure part 4 to the seat part, in this case the backrest 39. The association of the parts can, however, also be reversed. The end 20 of the strap 3 is spaced from the attachment axis B by approximately the entire length of the strap 3. The catch funnel of the latch member 1 is also spaced from the attachment axis A. In the embodiments, a screw fastening is provided. The shanks of the screws 33 and 34 are screwed into the nuts 31, 32 respectively associated with the body 38 and the backrest 39 respectively. The nuts 31 and 32 can be welded on. Between the screw head and the resting surface on the body part 28 and the backrest part 39 a rubber sleeve 28, 29 is, in each case, passed through by the screw 34, 33. The rubber sleeves 28, 29 have a circumferential groove into which edge regions of openings 24' and 30 of the wall 24 or mating closure part 4 are received respectively. As a result of this development, a friction-locked or elastically restorable attachment is assured, which, after being acted on by a moment of rotation, permits a certain turning of the latch member 1 or the mating closure part 4.

As shown, in particular, in FIG. 4, a swinging of latch member 1 and mating closure part 4 around the attachment axes A and B respectively is possible, so that a locking position is automatically present even in the event of a vertical offset of the axes A and B as a result of tolerances. The elasticity of the rubber sleeves 28, 29 furthermore makes it possible that even a transverse offset due to tolerance between the attachment points can easily be controlled. FIG. 5 shows that both the catch funnel of the latch member 1 and the tip 20 of the mating closure part 4 can be displaced in a direction Y substantially parallel to the two axes A and B. Also upon this transverse displacement, a reliable introduction is assured, this time as the result of the two facing inclines 18, 19 which widen the catch cross section.

Between the blade-shaped end of the strap and the attachment opening 30 on the mating closure part 4 a stretch zone comprising a labyrinth 40 can be provided on the other side of a bent portion which is possibly provided. The stretch labyrinth consists of a slot 41 which is located transverse to the lengthwise direction of the strap 3 on the surface of the wide side of the mating closure part. The slot 41 is surrounded by a total of four notches 42 which extend opposite each other in each case in front of and behind the slot inward from the lengthwise narrow side of the closure part 4.

In the embodiment shown in FIG. 8, a latch member 1, in this case one in accordance with the first embodiment, is fastened to a body part 38 and a mating closure part 4 is fastened to a backrest 39. In the erect position of the backrest (solid line) the strap 3 is engaged with the latch heads 6, 7 of the slide 5. The mating closure part 4 is connected via a cable 45 with an attachment point 46. Upon release of the latch heads 6, 7 by displacement of the handle 27, the backrest 39 can move forward into the position shown in dash-dot line. During this displacement, the cable is moved around a guide 47 and at the same time tightened, so that the strap 3 can swing into the seat. Upon the moving of the backrest back into the position shown in solid line in FIG. 8, the strap 3 again swings out of the backrest. This swinging is possible since the strap is prestressed via a spring 55. The spring 55 can be a coil spring which is wound on an attachment shaft of the mating closure part on the backrest. The force of the spring is greater than the holding friction of the fastening means. In this embodiment, the holding friction can also be kept very small by a suitable selection of the connecting means.

I claim:

1. A locking device suitable for orienting a backrest relative to a body part of a seat, the locking device comprising;

a closure part formed as a notched strap, a latch member having an insertion pocket for receiving the strap, and a detent element comprising a latch head, the the detent element being displaceable substantially transverse to a direction of insertion of the strap into the pocket for engagement of the latch head with notching of the strap; and fastening means for fastening said latch member and said closure part between the backrest and the body part, said fastening means having rubber members located at interfaces of the locking device with the backrest and the body part.

2. A locking device according to claim 1, wherein:

each of the latch member and the closure part has an attachment opening for receiving one of said rubber members; and each of the rubber members is formed as a sleeve having a screw passage opening.

3. A locking device comprising a closure part formed as a strap, a latch member having an insertion pocket for receiving the strap, and a latch head formed by a detent element, the latter being displaceable substantially transverse to a direction of insertion of the strap in the pocket for engagement with notching of the strap, and wherein the strap has a stretch zone which enables a lengthening of the strap upon an overloading of said strap.

4. A locking device comprising a latch member and a mating closure part for a swingable backrest and body of a vehicle comprising:

fastening means for swingably fastening the latch member and the closure part between the backrest and the body to provide a stationary fastening; and wherein said latch member comprises a manually actuatable detent element which is spring biased into a locking position for engagement with the closure part;

said detent element has a latch head;

said closure part comprises a strap having a recess;

said latch member has an insertion pocket for receiving the strap in a direction of insertion, and said latch head is displaceable essentially transversely to the direction of insertion of said strap, said latch head being configured for engagement with the recess of the strap; and wherein said fastening means provides a frictional-locking preventing unintended movement of said latch member and said closure part from their respective positions after a pivoting of said latch member and said closure part.

5. The locking device according to claim 4, wherein the strap has a pointed end, and the insertion pocket has an entrance-side receiving funnel formed for cooperation with the pointed insertion end of the strap.

6. The locking device according to claim 4, wherein said fastening means has pivot points located at the latch member and the closure part, respectively, and comprises rubber members located at interfaces of the locking device with the backrest and the body.

7. The locking device according to claim 6, wherein said latch member and said closure part have attachment openings;

said rubber members are formed as sleeves and are inserted into the attachment openings, and said sleeves have screw passage openings.

8. A locking device according to claim 7, wherein said fastening means each comprises a fastener having a head engaging one end of one of the sleeves and a shank extending through the screw passage opening of said one sleeve, said shank is operatively secured to one of said backrest and said body, the other end of said one sleeve resting against said one of said backrest and said body, said one sleeve having a centrally located outer circumferential groove, and an edge region of the attachment opening of either of the latch member or the mating closure part being received in said circumferential groove.

9. A locking device according to claim 8, wherein said fastening means each comprises a nut welded to said one of said backrest and said body, and said fastener is a screw, and said shank is screwed into said nut.

10. The locking device according to claim 4, wherein the strap has a stretch zone which enables a lengthening of the strap upon an overloading of the strap.

11. The locking device according to claim 4, wherein the strap of the closure part has recesses arranged in a row for receiving the latch head of the detent element, the detent element being formed as a slide and comprising a further latch head.

12. The locking device according to claim 11, wherein said strap has additional recesses, all of said recesses being arranged along a narrow longitudinal edge of the strap; and the detent element comprises a bend extending into said latch heads, all of the latch heads engaging the recesses, and said recesses are formed on a narrow longitudinal edge of the strap.

13. The locking device according to claim 4, wherein the strap has a hat-shape in cross section.

14. The locking device according to claim 4, further comprising an angularly formed handle operatively engaged with said detent element.

15. A locking device comprising a latch member and a mating closure part for a swingable backrest and a body of a vehicle, comprising;

fastening means for swingably fastening the latch member and the closure part between the backrest and the body to provide a stationary fastening; and wherein said latch member comprises a manually actuatable detent element which is spring biased into a locking position for engagement with the closure part, said detent element has a latch head;

said closure part comprises a strap having a recess;

said latch member has an insertion pocket for receiving the strap in a direction of insertion, and said latch head is displaceable essentially transversely to the direction of insertion of said strap, said latch head being configured for engagement with the recess of the strap; and wherein said fastening means comprises elastically restorable elements.

16. The locking device according to claim 15, wherein said restorable elements are rubber members.

17. The locking device according to claim 15, wherein the strap has a pointed insertion end; and the insertion pocket has an entrance-side receiving funnel configured for receiving the pointed insertion end of the strap.

18. A locking device according to claim 15, wherein said fastening means with said elastically restorable elements provide for a return moment of rotation on said latch member and said mating closure part, respectively, into an original position after said latch member and mating closure part are rotated.

19. A locking device according to claim 18, wherein each of said latch member and said closure part has an attachment opening;

said rubber members comprise sleeves disposed in respective ones of the attachment openings, and said sleeves have openings.

20. A locking device according to claim 19, wherein said fastening means each comprises a fastener having a head engaging one end of one of the sleeves and a shank extending through the passage opening of said one sleeve, said shank is operatively secured to one of said backrest and said body, the other end of said sleeve resting against said one of said backrest and said body, said one sleeve having a centrally located outer circumferential groove, and an edge region of the attachment opening of either of the latch member or the mating closure part being received in said circumferential groove.

21. A locking device according to claim 15, wherein said fastening means includes pivots located on the latch member and the mating closure part, respectively, and comprises rubber members serving as said elastically restorable elements, said rubber members being positioned within respective ones of said pivots.

\* \* \* \* \*